United States Patent [19]

Vereschagin et al.

[11] 4,049,783
[45] Sept. 20, 1977

[54] METHOD OF PRODUCING POLYCRYSTALLINE DIAMONDS

[76] Inventors: Leonid Fedorovich Vereschagin, Kutuzovsky prospekt, 2/1, kv. 231; Evgeny Nikolaevich Yakovlev, ulitsa Rusakovskaya, 4, kv. 63, both of Moscow; Tatyana Dmitrievna Varfolomeeva, p/o Akademgorodok, ulitsa Shkolnaya, 6, kv. 35, Moskovskaya Oblast, Podolsky Raion; Alexandr Yakovlevich Preobrazhensky, ulitsa Profsojuznaya, 52, korpus 5, kv. 21, Moscow; Vladislav Nikolaevich Slesarev, ulitsa Televidenia, 6/2, korpus 5, kv. 21, Moscow; Vasily Alexandrovich Stepanov, ulitsa Televidenia, 6/2, korpus 2, kv. 32, Moscow; Ljudmila Efimovna Shterenberg, ulitsa B. Dekabrskaya, 4, kv. 21, Moscow, all of U.S.S.R.

[21] Appl. No.: 320,679

[22] Filed: Jan. 2, 1973

Related U.S. Application Data

[63] Continuation of Ser. No. 92,405, Nov. 24, 1970, abandoned.

[30] Foreign Application Priority Data

Jan. 4, 1970  U.S.S.R. .................................. 1513780

[51] Int. Cl.² .............................................. C01B 31/06
[52] U.S. Cl. ....................................................... 423/446
[58] Field of Search ........................................ 423/446

[56] References Cited

U.S. PATENT DOCUMENTS

| 2,947,609 | 8/1960 | Strong | 423/446 |
| 3,031,269 | 4/1962 | Bovenkerk | 423/446 |
| 3,101,260 | 8/1963 | Cheney | 423/446 X |
| 3,148,161 | 9/1964 | Wentorf et al. | 423/446 X |

FOREIGN PATENT DOCUMENTS 638,117  3/1962  Canada ................................. 423/446

*Primary Examiner*—Edward J. Meros
*Attorney, Agent, or Firm*—Holman & Stern

[57] ABSTRACT

A method of producing polycrystalline diamonds which is characterized by providing a thermal contact of the reaction chamber with the cooled members of the device developing a high pressure and high temperatures for removing the heat generated within this chamber in the process of crystallization of a diamond, which method is also characterized in that the cross-sectional area of the metal-catalyst is not more than 0.04 that of the reaction chamber in a plane normal to the direction of the maximum withdrawal of the heat of crystallization. Said metal-catalyst is set in the carbon-containing material substantially in the center of the reaction chamber.

5 Claims, 2 Drawing Figures

METHOD OF PRODUCING POLYCRYSTALLINE DIAMONDS

This is a continuation, of application Ser. No. 92,405, filed Nov. 24, 1970, now abandoned.

The present invention relates to methods of producing super-hard materials and, more particularly, the invention relates to methods of producing polycrystalline diamonds.

The invention can most effectively be used both for making cutting tools of drilling machines and for making tools for working superhard alloys ("pobedit", etc.) with the provision of a high smoothness of the worked surface.

Known in the prior art are methods of producing polycrystalline diamonds which consist in that the reaction chamber of a device for creating of a high pressure and high temperatures having cooled members is filled with a carbon containing material. Then the material is subjected simultaneously to the action of a temperature of at least about 1200° C and a pressure at least about 80 kbar during the time sufficient for crystallization of a diamond.

In these known methods the reaction chamber is surrounded by a heat-insulating material and this does not allow one to remove from the reaction chamber the heat generated in the process of transformation of the carbon-containing material into diamond.

Therefore, the formation of a polycrystalline diamond is accompanied by an increase in temperature which in this case approaches the temperature lying (at this pressure) on the graphite-diamond balance curve in the phase diagram. Due to this fact the size of separate components of the polycrystals comes up to a value of 2 mm, i.e., the synthetically produced polycrystalline diamonds are coarse-grained.

In this connection, the strength of such polycrystalline diamonds is low, because the component crystals of the diamond do not intergrow between each other but are interconnected through a metal bond formed by the metal-catalyst.

In these known methods the metal-catalyst is taken in the form of disks which are alternated with layers of a carbon-containing material also shaped as disks. The carbon-containing material is usually composed of spectrally-pure graphite.

The diameter of the disks of the metal-catalyst is the same as that of the graphite disks or is closed to it.

In this case the entire surface of the disk is subject to the synthesis temperature and the process of development of a polycrystalline formation may be considered as that effected simultaneously from many centers. As a result, formed between the diamond crystals composing the polycrystalline formation are metallic inclusions having a considerable length (in the form of veins). This deteriorates the strength of the polycrystalline diamond formation as it cracks and splits just along these inclusions, which makes the tool made of such a polycrystalline formation practically useless.

An object of the present invention is to eliminate the above mentioned disadvantages.

The specific object of the invention is to provide a method of producing polycrystalline diamonds under such thermal conditions and such ratio between the sizes of the metal-catalyst and the carbon-containing material which would ensure the production of samples with a fine-grained structure and with a minimum content of localized non-diamond inclusions.

This object is attained by means of such a method of producing polycrystalline diamonds in which, according to the invention, the reaction chamber is in thermal contact with the cooled members of the device for building up a high pressure and high temperatures to remove the heat generated within the chamber in the process of crystallization of the diamond. In this case the cross-sectional area of the metal-catalyst occupies not higher than 0.04 of the cross-sectional area of the reaction chamber in a plane normal to the direction of the maximum withdrawal of the heat of crystallization and the metal-catalyst is arranged within the carbon-containing material, preferably in the center of the reaction chamber.

The heat of crystallization is preferbly removed from the reaction chamber at a rate of at least 25 cal/min.

Such thermal conditions of the process of synthesis and such a selection of the ratio between the sizes of the metal-catalyst and the carbon-containing material provide for obtaining the samples having a fine-grained structure with a minimum content of the localized non-diamond inclusions, the microstructure of which is identical with or close to the microstructure of natural diamonds of the carbonado type.

The problem is advantageously solved in that case when the metal-catalyst is taken in the form a rod installed by one end in the carbon-containing material in the center of the reaction chamber which through the other end of this rod is in thermal contact with the cooled members of the device.

To remove the heat of crystallization from the reaction chamber, introduced into the carbon-containing material is a rod of a material whose heat conduction is not lower than that of graphite and which is disposed within the reaction chamber so that it is in thermal contact with the cooled members of the device through this rod.

The problem can also be successively solved in the case when the carbon-containing material is surrounded by an envelope of an electrically insulating material, the heat conduction of which is not lower than that of graphite, which envelope forms a reaction chamber.

This envelope is preferably made of hexagonal boron nitride or boron carbonitride.

The carbon-containing material is spectroscopically pure graphite.

The invention is further described by way of example with reference to the accompanying drawings, in which.

Figures 1, 2:
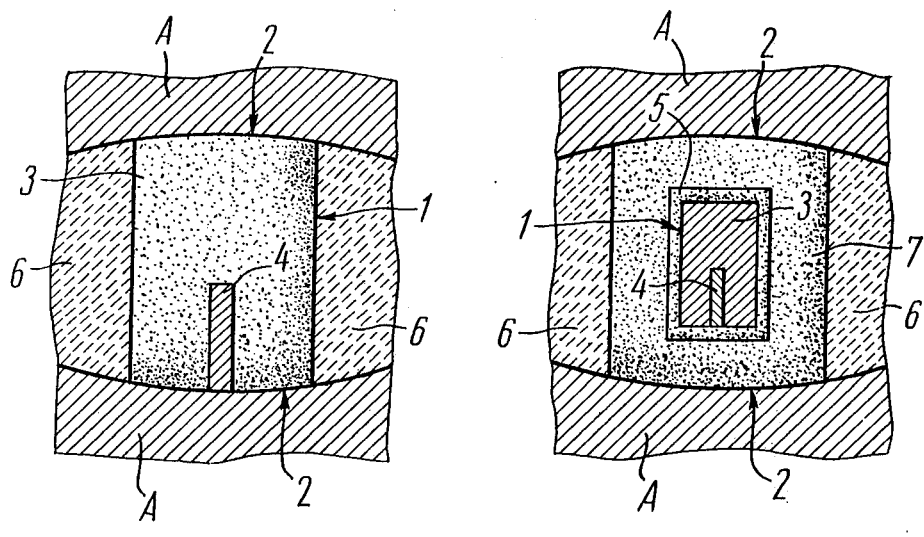
FIG. 1 is a diagram of disposition of the metal-catalyst relative to the carbon-containing material in a reaction chamber according to the proposed method.
FIG. 2 is the same, in which case the carbon-containing material is surrounded by an envelope forming a reaction chamber according to the proposed method.

The proposed method of producing polycrystalline diamonds consists in that a reaction chamber 1 (FIG. 1) of a device A (shown partly), developing a high pressure and high temperatures and having cooled members 2, is filled with a carbon-containing material 3 in the presence of a metal-catalyst 4 and is subjected to a simultaneous action of a temperature of at least about 1200° C and a pressure of at least about 80 kbar during a time adequate for crystallization of a diamond. According to the invention, the reaction chamber 1 is in thermal contact with the above-said cooled members 2 to remove the heat generated within the chamber 1 in the process of crystallization of the diamond.

It is evident that for obtaining polycrystalline diamond structures the pressure and temperature of the synthesis must be located as far as possible from the pressures and temperatures lying on the graphite-diamond balance curve on the carbon phase diagram.

To obtain the polycrystalline diamonds having a microstructure close to the microstructure of natural carbonado, it is necessary to apply a pressure exceeding 80 kbar and temperatures approaching the minimum temperature of the synthesis with the given metal-catalyst.

However, in order to maintain a predetermined temperature of the synthesis during the whole period of formation of a polycrystalline diamond, it is necessary to remove the heat of crystallization from the reaction chamber.

Considered below is the relationship between the heat generated in the process of crystallization of the diamond and the increase in temperature in the reaction chamber. For this purpose the Clayperon-Klausius equation is used, according to which the heat of crystallization (the heat of transformation of graphite into diamond) $g$ is equal to $$g = dp/dT \cdot T \Delta V$$

where: $dp/dT$ is an inclination of the graphite-diamond balance curve;

$T$ is a temperature in the reaction chamber (°K);

$\Delta V$ is a difference of the molar volumes of graphite and diamond at pressure $P$ and temperature $T$ of the experiment.

It has been found that at $T = 1500°$ C $g = 1980$ cal/mol.

As the heat absorption capacity of spectrally pure graphite with a specific gravity equal to 1.6 g/cm³ at a temperature of 1773° K (1500° C) is equal to 5.88 cal-degree·mol, the increase in temperature in the reaction chamber will be $$\frac{1980 \frac{cal}{mol}}{5.88 \frac{cal}{degree \cdot mol}} \approx 340°$$

This estimation shows how important it is to remove the heat of crystallization from the reaction chamber for the purpose of eliminating such a considerable increase in temperature within this chamber.

The preferable rate of removing the heat of crystallization from the reaction chamber depends on the rate of transformation of the carbon-containing material into diamond (which, in its turn, depends on the pressure), which is the higher, the higher is the pressure.

It has been found that at a temperature about 1500° C and a pressure of 89 kbar the rate of the process of crystallization is such that a polycrystalline diamond weighing about 37 mg is formed during 15 seconds. A specialist competent in this field can easily calculate that the rate of removing the heat of crystallization must be within the range of 25 cal/min. At higher pressures the heat of crystallization must be removed at a higher rate.

Due to the removal of the heat of crystallization from the reaction chamber it is possible to synthesize polycrystalline formations having a fine-grained structure.

The samples obtained at a pressure of 144 kbar have a size of the grains lower than that of a natural formation of diamond - carbonado.

The practical way of effecting the heat contact of the reaction chamber with the cooled members 2 of the device A for removing the heat from this chamber will be described later.

According to the invention, the metal-catalyst 4 has a cross-sectional area of not more than 0.04 that of the reaction chamber in a plane normal to the direction of the maximum withdrawal of the heat of crystallization. The metal-catalyst is set in the carbon-containing material 3, preferably in the center of the reaction chamber, i.e., within the zone of the maximum temperature, as the cooled members of the device A are located symmetrically relative to the chamber being in thermal contact therewith.

If the metal-catalyst 4 is shaped as a rod, it is installed in the carbon-containing material 3 by one end in the center of the reaction chamber 1, the later through the other end of the rod being in thermal contact with the cooled member 2 of the device A.

Due to the fact that the rod-catalyst has a low cross-sectional area (as compared with the cross-sectional area of the chamber) the synthesis of the polycrystalline diamond formation may be considered as that effected from the single center.

In this case the movable films of the catalyst do not intersect each other, thus there is provided "single-bonding" of the film of the metal-catalyst. Due to this fact it is possible to obtain a strong formation of a diamond having no large metallic inclusions, while the non-diamonds inclusions available are localized.

The presence of a liquid film of the metal-catalyst provides for intergrowing of separate crystals corresponding the sample and their twinning.

The microstructure of the obtained formations by the size of the grains, the amount and disposition of non-diamond inclusions resembles the microstructure of natural diamonds of the carbonado type.

The polycrystalline diamond formations synthesized according to the proposed invention are characterized by a high strength, hardness and isotropic properties. The mechanical properties of the synthesized diamonds in many cases are not inferior to those of natural diamonds and, sometimes, surpass them.

Owing to the fact that only a small portion of the head section of the metal-catalyst takes part in the process of synthesis, the rod needs not to be made wholly of the metal-catalyst. It is expedient to make only the head of the rod from this metal. In this case a version is possible in which the metal-catalyst is not in direct contact with the rod used for removing the heat of crystallization from the reaction chamber and which can be made of a material whose thermal conduction is not lower than that of graphite. This rod is introduced into the carbon-containing material and is disposed in the reaction chamber so that this chamber is in thermal contact with the cooled members 2 of the device A.

The time of synthesis of the diamond polycrystalline formations is the shorter, the higher is the pressure of the synthesis. This time amounts up to 1 minute depending on the pressure. This provides for adequate process conditions of the proposed method.

The size of the produced polycrystalline formation is determined by the dimensions of the reaction chamber and by the time of maintenance of the parameters of the synthesis.

It is possible to synthesize the polycrystalline diamond formations which have a shape of the cutting portions of tools: cutters, smoothers, glass cutters, dies, bits, etc. For this purpose the reaction chamber is shaped so that it is similar to the form of the future article.

According to the invention, the reaction chamber may be formed by an envelope 5 (FIG. 2) of an electrically insulating material whose thermal conduction is not lower than that of graphite, said envelope 5 surrounding the carbon-containing material.

The envelope 5 may be made of hexagonal boron nitride or boron carbonitride.

The envelope 5 is in thermal contact with the cooled members 2 of the device A and this, when taken in conjunction with the high heat conduction of the material of which it is made, makes it possible to remove the heat of crystallization generated during the "graphite-diamond" transformation at an adequate rate.

Given below are some examples of carrying the proposed method into effect.

Commercial polycrystalline spectroscopically pure graphite was used as a carbon-containing material. A chrome-nickel alloy (20% Cr, 80% Ni) made in the form of a rod was taken as a metal-catalyst.

In all cases the heat of crystallization was removed at a rate of at least 25 cal/min. The reaction chamber may be of any size.

EXAMPLE 1

A reaction chamber 1 (FIG. 1) is used whose diameter is equal to 7 mm ($S = 38.4$ mm$^2$) and height is equal to 7 mm. The walls 6 of the chamber are made of pyrophillite which serves as a medium transmitting a pressure. The chamber is in direct thermal contact with the cooled members 2 of the device A for building up a high pressure and high temperatures.

The chamber is filled with spectroscopically pure graphite into which is introduced a metal-catalyst in the form of a rod having a diameter of 0.7 mm and a cross-sectional area $S = 0.38$ mm$^2$ and a length of 3.5 mm, one end of the rod being positioned in the center of the chamber and the other end thereof being in direct contact with the cooled members 2 of the device A. Then the reaction chamber is subjected to a pressure of about 89 kbar, thereafter, an electric current is fed through the carbon-containing material — graphite, until the temperature in the center of the chamber is equal to 1400° C. The synthesis of the polycrystalline formation is started which continues 45 seconds. After that, the applied electric power is decreased and the pressure is reduced to the atmospheric pressure.

The produced sample is withdrawn by mechanically removing the pyrophillite and the non-reacted graphite.

The polycrystalline diamond has a shape of a ball with a diameter of 2.5 mm. Its fine-grained structure with localized inclusions of the metal-catalyst and the graphite sized about 5 microns may be considered as an intermediate structure between the microstructures of the natural formations of the ballast and carbonado type.

EXAMPLE 2

All operations are the same as in Example 1 but in this case the temperature in the center of the chamber is equal to 1500° C. A polycrystalline diamond has been produced having a shape of a cylinder 3.0 mm high and 2.15 mm in diameter, the diamond microstructure being intermediate between the microstructures of the natural formations of the ballas and carbonado type.

EXAMPLE 3

All operations ae effected as described in Example 1 except that the reaction chamber is taken having a diameter of 4 mm (the cross-sectional area $S = 12.96$ mm$^2$) and a height of 5 mm, while the metal-catalyst 4 is taken in the form of a rod having a diameter of 0.3 mm (the cross-sectional area $S = 0.07$ mm$^2$) and a height of 2.5 mm.

The pressure is equal to 144 kbar, the temperature in the center of the chamber is 1400° C, the time of synthesis is within a few fractions of a second.

A ball-shaped diamond has been produced having a diameter of 2 mm and a microstructure similar to that of the natural diamond formation of the carbonado type. The size of the non-diamond inclusions is within ∼1 micron.

EXAMPLE 4

The reaction chamber is used which is formed by the envelope 5 (FIG. 2) of boron carbonitride having a diameter of 5 mm (the cross-sectional area is equal to 19.62 mm$^2$), a height of 4.5 mm and a thickness of 1 mm. The reaction chamber is filled with spectroscopically pure graphite, into which is introduced a metal-catalyst 4 in the form of a rod having a diameter of 0.7 mm (the cross-sectional area is 0.38 mm$^2$), and a height of 2 mm. The synthesis is effected under a pressure of 89 kbar and at a temperature in the center of the chamber equal to 1400° C (the heating is carried out with the help of a heater 7).

The time of maintaining these parameters is equal to 1 minute.

A polycrystalline diamond has been produced in the form of a cylinder having a height of 3.45 mm and a diameter of 4.3 mm with a microstructure intermediate between those of the natural diamond formations of the ballas and carbonado type.

The field of application of the polycrystalline diamonds with a microstructure of a carbonado-type natural diamond or close to such a structure is rather wide. These diamonds can be used, for example, as cutting members of boring tools (bits, cutters, etc.).

The tests of the manufactured boring tools have shown that such diamond tools have a high working capacity and can effectively be used in the process of boring abrasive rocks of medium and high hardness. On boring the hard rocks) (of the VIII-X categories), the bits with the synthetic diamonds have shown a working capacity which not lower than that of the standard bits made of natural diamonds.

The tests conducted both under laboratory and industrial conditions have shown that the tools based on the polycrystalline diamonds according to the present invention, such as dressing pencils for dressing grinding wheels, smoothers, cutters (for example, for turning glass-fibre laminates) in many cases can successively replace the tools based on natural diamonds.

The possibilities of the synthetic carbonado may also be illustrated by the fact that the cutters made of this diamond can effectively be used for working hard alloys of the "carbo-alloy" type while providing for a highly smooth surface of the worked member.

We claim:

1. A method for producing polycrystalline diamonds which comprises: filling a reaction chamber of a device for developing high pressure and high temperatures and having cooled portions with a carbon material; subjecting the carbon material in the presence of a metal catalyst to the simultaneous action of high pressures of at least 80 kbar and diamond synthesizing temperatures of at least about 1,200° C and approaching the minimum temperature of diamond synthesis with the given metal catalyst for a period of time sufficient to obtain diamond crystallization; maintaining said reaction chamber in thermal contact with said cooled portions so as to effect removal of heat developed therein in the course of diamond crystallization at a rate of not less than 25 cal/min, said metal catalyst having a cross-sectional area of not more than 0.04 of the area of transverse section of said reaction chamber and being positioned in the carbon material substantially in the center of said reaction chamber, so as to ensure the growth of polycrystalline fine-grain diamond sample containing mutually intergrown crystallites.

2. The method of claim 1, wherein said thermal contact of the reaction chamber with the cooled portions of said device is effected through a material whose heat conductivity is not lower than the heat conductivity of graphite at said high pressures and temperatures.

3. The method of claim 2, wherein the material, through which thermal contact is effected between the reaction chamber and the cooled portions of the high pressure and high temperature device, is graphite.

4. The method of claim 2, wherein the material through which thermal contact is effected between the reaction chamber and the cooled portions of the high pressure and high temperature device, is boron nitride.

5. The method of claim 2, wherein the material, through which thermal contact is effected between the reaction chamber and the cooled portions of the high pressure and high temperature device, is boron carbonitride.

* * * * *